United States Patent [19]

Moghe

[11] Patent Number: 5,033,925
[45] Date of Patent: Jul. 23, 1991

[54] COMPOSITE NUT AND BOLT

[75] Inventor: Sharad R. Moghe, Northfield Center, Ohio

[73] Assignee: The B.F. Goodrich Company, Akron, Ohio

[21] Appl. No.: 285,483

[22] Filed: Dec. 16, 1988

[51] Int. Cl.⁵ .................. F16B 35/00; F16B 37/16
[52] U.S. Cl. .................. 411/366; 411/82; 411/258; 411/436; 411/901; 411/908
[58] Field of Search .......... 411/411, 424, 366, 82, 411/258, 907, 908, 901, 902, 903, 904, 900; 405/259-261; 156/148, 149, 391-393, 468, 475

[56] References Cited

U.S. PATENT DOCUMENTS

| Re. 28,574 | 10/1975 | Ruoff | 425/78 |
|---|---|---|---|
| 2,306,516 | 12/1942 | Zahn | 22/190 |
| 3,283,050 | 11/1966 | Boggs | 411/900 |
| 3,394,527 | 7/1968 | McLean | 405/260 |
| 3,495,494 | 2/1970 | Scott . | |
| 4,265,981 | 5/1981 | Campbell | 428/591 |
| 4,389,269 | 1/1983 | Cooper et al. | 156/172 |
| 4,478,544 | 10/1984 | Strand | 411/34 |
| 4,478,545 | 10/1984 | Mizusawa et al. | 411/437 |
| 4,581,263 | 4/1986 | Lukas | 428/36 |
| 4,620,401 | 11/1986 | L'Esperance et al. | 52/309.15 |
| 4,623,290 | 11/1986 | Kikuzawa et al. | 411/908 |
| 4,659,268 | 4/1987 | Del Mundo et al. | 411/901 |
| 4,687,394 | 8/1987 | Berecz | 411/908 |
| 4,687,395 | 8/1987 | Berecz et al. | 411/901 |
| 4,687,396 | 8/1987 | Berecz | 411/908 |
| 4,687,397 | 8/1987 | Berecz | 411/901 |
| 4,687,398 | 8/1987 | Berecz | 411/908 |
| 4,717,302 | 1/1988 | Adams et al. | 411/903 |

OTHER PUBLICATIONS

Advertisement by Tiodize Co., p. 29, Advanced Composites, Nov./Dec. 1988.
Tough Composites Advance Aerospace Race, Engineering News.

Primary Examiner—Neill R. Wilson
Attorney, Agent, or Firm—David M. Ronyak

[57] ABSTRACT

A hollow composite internally threaded member such as a nut includes a reinforcing fabric layer such as a braided or knit layer extending in the axial direction of the member and conforming to its threads. A method of making such an internally threaded member comprises forming and embedding in a polymeric matrix a reinforcing fabric layer on an externally threaded cylindrical core and thereafter removing the core. Such internally threaded member may be threadedly joined and adhesively bonded to an externally threaded member of complementary thread pitch and thread diameter to form a bolt. The externally threaded member may comprise an elongate core having an integral tubular fabric layer bonded to its exterior surface.

12 Claims, 3 Drawing Sheets

FIG. 3G

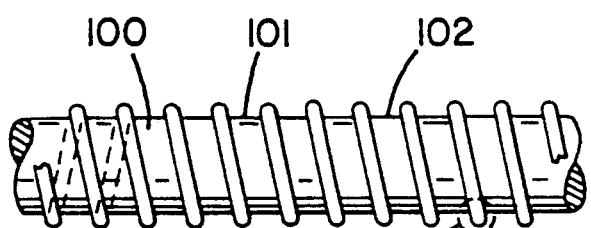
FIG. 2A
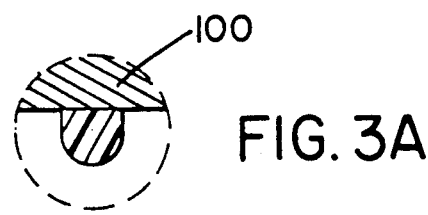
FIG. 3A
FIG. 2B
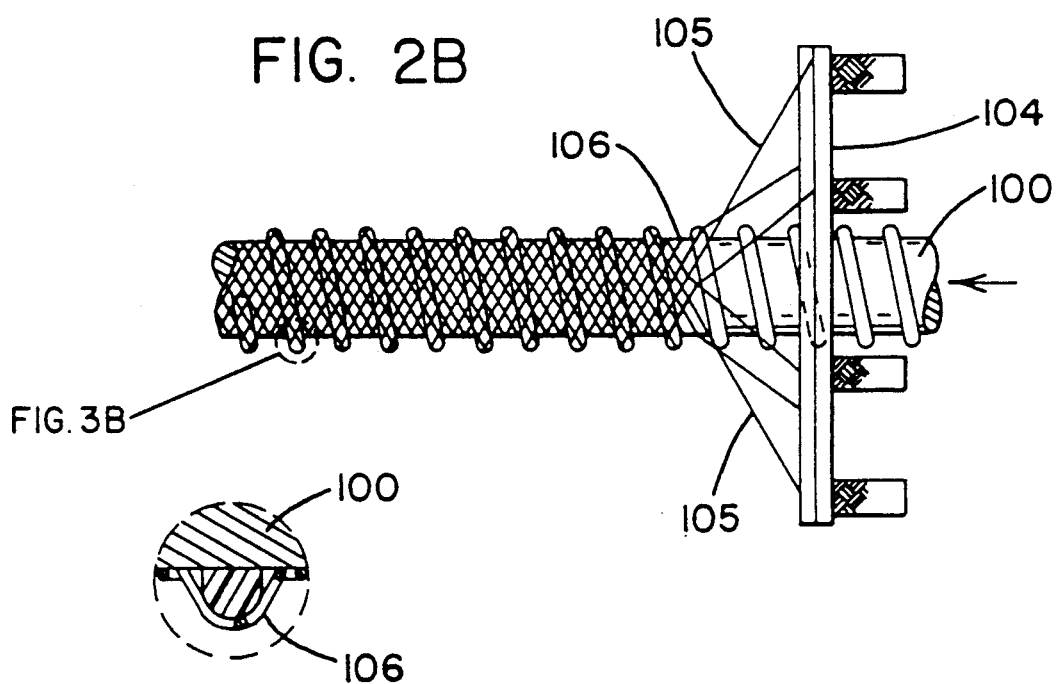
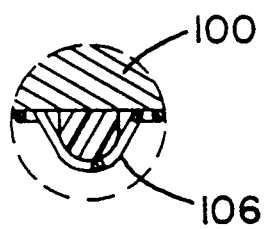
FIG. 3B
FIG. 2C
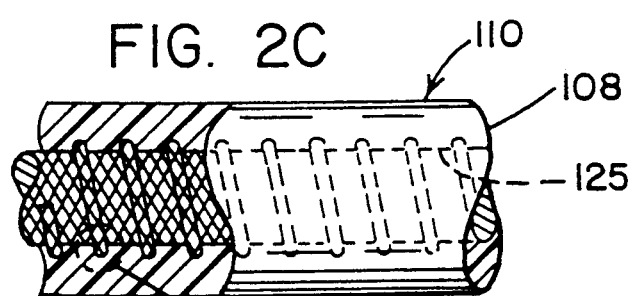
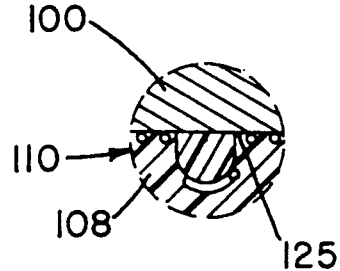
FIG. 3C

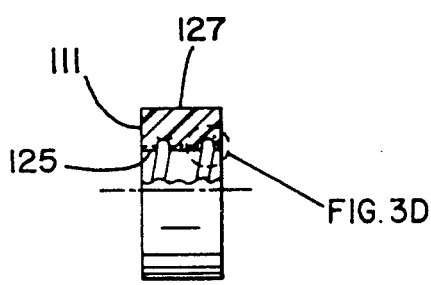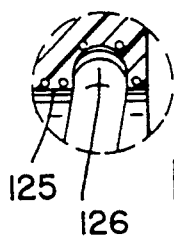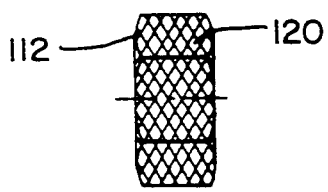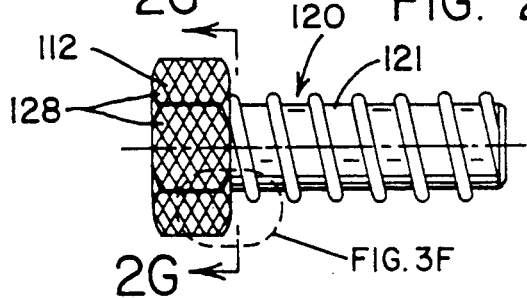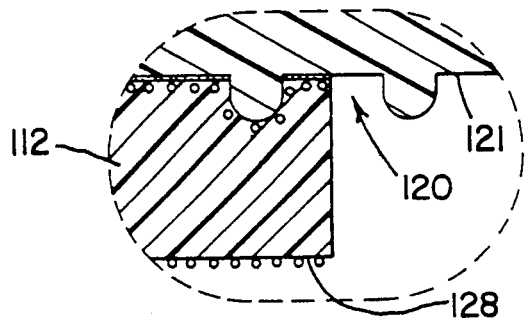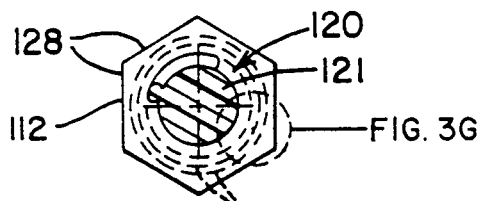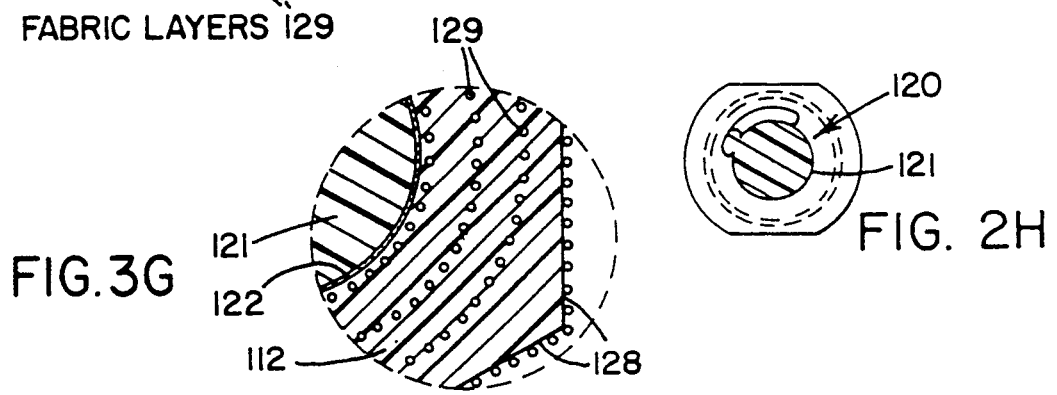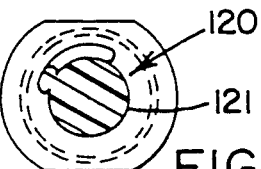

COMPOSITE NUT AND BOLT

This invention relates to reinforced threaded plastic members such as nuts and bolts, and more particularly threaded composite members which are reinforced with fibers extending in multiple directions and to a method of making same.

This application is related to application Ser. No. 07/285,480 entitled BRAIDED COMPOSITE THREADED MEMBER, filed on Dec. 16, 1989 and application Ser. No. 07/285,482 entitled FIBER REINFORCED COMPOSITE THREADED MEMBER filed on Dec. 16, 1988, the disclosures of which are incorporated herein by reference as if fully set forth herein.

BACKGROUND OF THE INVENTION

Fiber-reinforced polymeric resin composite materials are now widely used due to their outstanding strength to weight characteristics. These characteristics are especially important in the aircraft industry. Currently, structural components of these composite materials are joined to one another or to structural composites of the airframe employing other materials such as conventional metallic fasteners or adhesives. Conventional metallic mechanical fasteners are unsatisfactory for several reasons. They are subject to a weight penalty and are susceptible to galvanic corrosion. Vibrations encountered during normal flight conditions and severe loading as experienced in storms or emergency maneuvers may result in failure of the fastener to the composite structure joint. Adhesively bonded joints cannot be readily disassembled for service and maintenance.

While attempts to solve the aforestated deficiencies have been made using composite plastic fasteners, these earlier efforts have not been widely adopted due to economic or technical shortcomings.

For example, U.S. Pat. No. 3,495,494 to A.L. Scott discloses a threaded plastic member having a glass fiber reinforced thread in which a plurality of resin impregnated glass fiber reinforcing filaments are disposed in serpentine manner throughout the cross section of the thread and extending longitudinally of the axis of the threaded member. Manufacture of the threaded member requires a precision mold having a cavity complementary to that of the member to be formed. According to Scott, nuts may be formed by curing a plurality of resin-impregnated filaments laid axially about a rod having complementary threads and thereafter unscrewing the rod from the molding and cutting the molding into a plurality of nuts. To form the head on a bolt, one of these nuts is screwed onto one end of the shank molding and cemented into place.

U.S. Pat. No. 4,478,544 to Strand discloses a reinforced plastic rivet formed of carbon fibers encapsulated in an incompletely polymerized thermoset resin matrix. To use the rivet, its head portion is heated to soften the resin, the head is upset and fully polymerized. As with all rivets, this one is not threaded. This rivet has the further disadvantage of needing to be stored in a controlled low temperature environment prior to use to prevent premature setting of the resin.

U.S. Pat. No. 2,306,516 to Zahn discloses the use of a parting medium or membrane, such as rubber, over a threaded fastener which functions as a pattern to manufacture a hollow casting mold.

U.S. Pat. No. 4,389,269 to Cooper et al discloses a sport racket frame construction and a method of making same. A resin-impregnated tow is wound about part of a braided tow tube and thereafter a second braided tow tube is placed thereon to form an assembly that is internally pressurized and heat cured.

U.S. Pat. No. 4,265,981 to Campbell discloses impact resisting composites which may comprise multiple parallel filaments helically wrapped by continuous multiple filaments or strips and embedded in a matrix material.

It is evident from the foregoing that a need remains for a threaded composite fastener that may be made economically in the absence of expensive molds and exhibits physical characteristics similar to modern composite materials such as those employed in aerospace applications and in harsh chemical environments.

SUMMARY OF THE INVENTION

According to an aspect of the present invention, there is provided a method of making a hollow composite internally threaded member comprising: providing an elongate externally threaded cylindrical core, which is treated with a release agent; forming on the core a reinforcing fabric layer enveloping the core and conforming to the threads of the core; embedding the reinforcing fabric layer in a polymeric matrix.

According to another aspect of the invention, there is provided a hollow internally threaded member formed of fibers in a polymer matrix, said member having an interior surface having an integral thread having a rounded apex, said thread including a reinforcing fabric layer extending in the axial direction of the member and conforming to the threads.

According to a further aspect of the invention, there is provided in combination a hollow internally threaded member formed of fibers in a polymeric matrix, said member having an interior surface having an integral thread having a rounded apex, said thread including a reinforcing fabric layer extending in the axial direction of the member and conforming to the threads, said hollow internally threaded member being threadedly joined to an externally threaded member of complementary thread pitch and thread diameter, said externally threaded member comprising an elongate core and an integral tubular layer of textile fabric bonded to the exterior surface of the core, said integral textile layer being selected from one of continuous woven, continuous knit or continuous braided textile material, the textile layer enveloping, conforming and bonded with polymeric matrix to the exterior of the polymeric core.

There is no restriction on the type of fiber or matrix which may be employed in the construction.

The elongate externally threaded cylindrical core may be solid or hollow. The elongate threaded cylindrical core may itself be a composite member as described in co-pending Application Serial No. 07/285,480 filed on Dec. 16, 1988 entitled BRAIDED COMPOSITE THREADED MEMBER or in co-pending application Ser. No. 07/285,482 filed on Dec. 16, 1988 entitled FIBER REINFORCED COMPOSITE THREADED MEMBER. The core may contain a helical thread defining element which contains a fibrous reinforcement or may be defined by a bundle of filaments, a braided or twisted cord or a polymeric matrix alone or in combination with one of the foregoing. The core may include a braided layer thereon in which at least one element of greater radial projection relative to the core than the remainder of the elements forming the braided layer is included, the element of greater radial projection defining a helical thread on the core.

There is no restriction in the type of fiber or polymeric matrix which may be employed in the method. The reinforcing fabric layer of the hollow internally threaded member may be braided or knit. Heat and pressure may be applied subsequent to formation of the reinforcing fabric layer to effect consolidation of the fabric layer and associated polymeric matrix with the underlying threaded core. Provision of a release coating on the core prior to formation of the hollow internally threaded member enables separation of the completed internally threaded member from the core on which it is formed. No mold is required external of the internally threaded member. The assembly upon the previously formed threaded core may be completed by curing/consolidating the fabric reinforced matrix internal threaded member upon the molding core in an autoclave.

The above and other features and advantages of the invention will become more apparent from the following detailed description and appendant claims taken in conjunction with the accompanying drawings in which like reference numbers are used to refer to like parts, which together form a part of the specification.

BRIEF DESCRIPTION OF THE DRAWINGS

FIG. 2a is a side elevational schematic view of an externally threaded cylindrical core for use in manufacturing an internally threaded member according to the invention.

FIG. 3a is an enlarged sectional view of the encircled region of FIG. 2a.

FIG. 2b is a side elevational schematic view depicting formation of a reinforcing fabric layer of an internally threaded member according to the invention.

FIG. 3b is an enlarged sectional view of the encircled region of FIG. 2b.

FIG. 2c is a side elevational view of a completed internally threaded member according to the present invention with the externally threaded core partly withdrawn.

FIG. FIG. 3c is an enlarged sectional view of the encircled region of FIG. 2c.

FIG. 2d is a side elevational view of an internally threaded member according to the invention cut from the member shown in FIG. 2c.

FIG. 3d is an enlarged view of the encircled region of FIG. 2d.

FIG. 2e is a side elevational view of a hex nut according to the present invention.

FIG. 2f is a side elevational view of a composite bolt according to the present invention.

FIG. 3f is an enlarged sectional view of the encircled region of FIG. 2f.

FIG. 2g is a sectional view taken along lines 2g—2g of FIG. 2f.

FIG. 3g is an enlarged view of the encircled region of FIG. 2g.

DETAILED DESCRIPTION OF THE INVENTION

Figure 1:
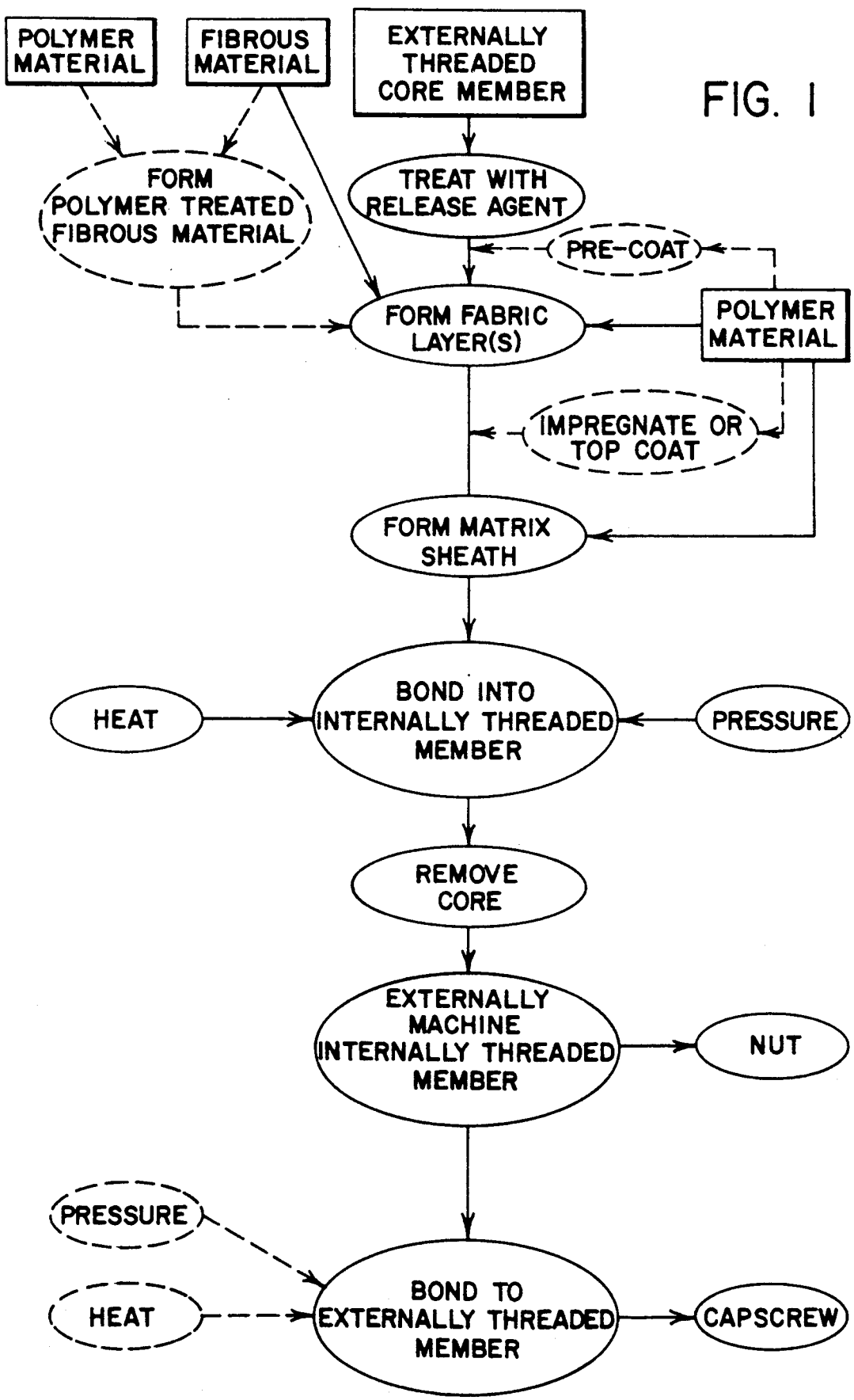
FIG. 1 is a flow chart depicting schematically in solid lines a preferred process and in dashed lines process variations and alternatives for the manufacture of certain embodiments of threaded composite members according to the present invention.

As used herein, the terms having, including, comprising and containing are synonymous. Unless otherwise specified at the point of use, all percentages, fractions and ratios in this specification, including the claims appended thereto, are on a weight basis. The term "rod" as used herein means a slender bar and may be hollow or solid. The term "pitch" and related forms as used herein means the distance from any point on the helical thread of a thread member to the corresponding point on the adjacent thread formed by that same helical member measured parallel to the longitudinal axis of the threaded member. The term "helix angle" as used herein means the acute angle formed by the path of a thread-defining helical element and the axial or lengthwise direction of the threaded member. A higher helix angle corresponds to a smaller pitch for threaded members of equal diameter and thread defining element radial projection. In the present specification and including its accompanying drawing, like numbers are used to refer to like features or members.

In FIGS. 2c, 3c, 2d, 3d and 2e there are shown embodiments of internally threaded members 110, 111, and 112 respectively according to the invention. Hollow internally threaded member 110 is formed of a fiber-reinforced polymeric matrix. The interior surface of threaded member 110 includes an integral thread having a rounded apex. The thread includes a reinforcing fabric layer which extends in the axial direction of internally threaded member 110 and conforms to the contour of the internal thread thereof.

In FIGS. 2d and 3d there is shown an internally threaded member like that shown in FIG. 2c and 3c, the difference being that the member 111 has been sliced from a greater axial length element such as member 110. The exterior axially extending surfaces of members 110 and 111 are cylindrical. FIG. 2e shows a hexagonal internally threaded member or nut 112 which in other respects is like members 110 and 111. The interior surface 125 in member 110, 111, 112 includes a helical thread 126 extending in its lengthwise or axial direction. The reinforcing fabric layer is undulate and conforms to and extends throughout the contour of the threaded interior surface 125 of member 110, 111, 112. The reinforcing fabric layer is preferably a continuous tubular fabric layer formed in the manner shown in FIG. 2b by braiding or knitting suitable high modulus textile fibers. Preferred are fibers of high Young's modulus such as those of aramid, glass and carbon.

In FIGS. 2f, 3f, 2g and 3g there is shown a composite bolt 120 according to the present invention which has been formed by threadedly joining a internally threaded member such as nut 112 to a separately formed externally threaded composite member 121 which may have been formed in the manner described in co-pending applications Ser. No. 07/285,480 and 07/285,482 and respectively filed on Dec. 16, 1988. Nut 112 is threaded on to threaded shank 121 and is bonded with adhesive 122 to prevent further rotation of nut 112 relative to shank 121. Bonding is accomplished with polymeric material such as epoxy or other matrix which is compatible with the matrices of nut 112 and shank 121.

In FIG. 1, there is shown a manner of manufacture according to the invention of an internallY threaded member according to the present invention. An externally threaded cylindrical core such as core 100 depicted in FIG. 2a and 3a is used as a carrier and mold for formation of an internally threaded member such as member 110 depicted in FIG. 2c. Core 100 must include an exterior surface 101 which will not bond to the internally threaded member to be formed except where it is desired to form directly a threaded bolt or the like such as that depicted in FIGS. 2f and 3f. The externally threaded cylindrical core 100 is surface treated with release agent 102 as shown in FIG. 1 and FIG. 2a.

Thereafter, one or more reinforcing fabric layers are formed on core 100. This is preferably accomplished as shown in FIG. 2b by passing core 100 through a tubular braiding or knitting machine or succession of such machines. Braiding or knitting machine 104 is provided with a plurality of carriers each letting off a continuous tow of fibrous material 105 which is laid up into a tubular reinforcing fabric layer 106 on core 100. The reinforcing fabric layer 106 envelopes and conforms to the contours defined by the helical threads of the outer surface 101 of core 100.

The reinforcing fabric layer 106 is multidirectional in character; it has fibrous elements which extend at differing angles relative to the axial direction of the internally threaded member being formed, at least some of the fibrous elements extending generally in the same direction as the helical threads and others of the fibrous elements extending generally in a direction opposite to that of the helical threads.

A sheath or covering of polymeric matrix is applied to the combined externally threaded core and fabric layer 106. Polymeric material may be precoated onto the fibrous material 105. Such fibrous material 105 may alternatively be impregnated with polymeric material prior to or subsequent to conversion into fabric layer 106 on the core 100.

While the formation of a single reinforcing fabric layer 106 is depicted in FIG. 2, a plurality of reinforcing fabric layers may be sequentially formed each upon the preceding underlying reinforcing fabric layer. Polymeric matrix material may be applied between application of each successive reinforcing fabric layer. Alternatively, polymeric material may be applied subsequent to application of all of the reinforcing fabric layers such as by pressure impregnation. When applied, the polymeric material, if a liquid, must be of sufficient viscosity to remain with the fibrous material and not drip off the combined internally threaded member being manufactured and its underlying core. To avoid the tendency of the liquid polymeric material to run due to influence of gravity, the core and internally threaded member being manufactured may be rotated about the horizonally oriented longitudinal axis of the core 100.

After application of the final polymeric material which encapsulates and forms a polymeric matrix sheath 108 upon the underlying reinforcing fabric layer such as 106, the assembly is preferably subjected to heat and pressure to consolidate and bond the polymeric matrix and the fabric layers into a unitary, stable, internally threaded composite member such as member 110 shown in FIGS. 2c and 3c. This may be conveniently accomplished in an ordinary autoclave when thermosettable polymeric resins are employed. Autoclaving may also be employed with thermoplastic polymeric resins. No external mold is required.

When room temperature chemically setting resins are employed, it is possible to manufacture internally threaded members according to the invention without application of heat or pressure.

Subsequent to the bonding operation, the combined internally threaded member and its core are removed from the autoclave, thereafter the newly formed internally threaded member 110 is removed from core 100 by rotating member 110 relative to core 100. As shown in FIG. 2c, core 100 has been partially withdrawn from the right hand portion of internally threaded member 110. The previously applied release agent 101 facilitates separation of internally threaded member 110 from core 100.

Preferably, internally threaded member 110 is made of sufficient axial length such that it may be cut into a plurality of smaller internally threaded members such as internally threaded member 111 shown in FIG. 2d. The exterior cylindrical surface 127 of member 111 may be machined to form a hexagonal outer surface 128 such as that shown for member 112 in FIGS. 2e, 2f and 2g. It is also possible to machine the exterior surface of internally threaded member 110 prior to slicing it into a plurality of hex nuts such as nut 112 shown in FIG. 2e. Hex nut 112 includes a continuous helical thread 126 extending in the axial direction of nut 112 within its central aperture. Internal helical thread 126 is reinforced by reinforcing fabric layer 106 which conforms to the contour defined by external helical thread of core 100. As shown in FIG. 2g, nut 112 includes a plurality of coaxial fabric reinforcing layers 129 distributed throughout its cross-sectional area.

Nut 112 may be threadedly joined to an externally threaded composite member such as shank 121 shown in FIGS. 2f and 3f and FIGS. 2g and 3g. The manufacture of shank 121 is described in detail in co-pending applications Ser. No. 07/285,480 and 07/2,185,482 filed on Dec. 16, 1988. Nut 112 is bonded to shank 121 with polymeric material 122 such as an epoxy adhesive to form composite bolt 120.

It is also possible to utilize resin materials which may be B-staged. Polyesters and epoxies are examples of such resins. In this instance an optional process for formation of items such as bolt 120 depicted in FIGS. 2f and 2g includes only B-staging the internally and externally threaded members such as the nut and shank prior to threadedly joining them and thereafter applying heat and pressure to consolidate the internally threaded member to the shank and effect a chemical bond therebetween.

Selection of the resin and fabric materials for nut 112 and shank 121 is based primarily on intended end use according to the in-service properties required for the intended application. In low temperature and low stress applications, it is adequate to utilize a shank formed of extruded thermoplastic such as, by way of example and without limitation, nylon. Where greater strength is desired or necessary, the polymer matrix may be filled with discontinuous or continuous fibers. Crystalline polymers are generally more resistant to creep than non-crystalline polymers. Where greatest strength and resistance to creep are desired, the core is preferably formed of thermosettable polymeric matrix which is reinforced with continuous fibers which extend in the axial, that is the lengthwise direction of shank 121. Suitable resins include, by way of example and without limitation, nylons (polyamides), polyesters, polyolefins, polyaroline sulfides (pps), epoxies, polyimides, and the like. Suitable fibers include, by way of example and without limitation, glass, aramid, ceramic fibers and whiskers, and carbon fibers, and the like, including combinations thereof. The fibers of the nut and shank should have a Young's modulus greater than that of the polymeric matrix in which they are embedded.

A particularly suitable shank for applications where high modulus and strength and temperature are desired is a rod formed of glass fiber or carbon fiber in a polyphenylene sulfide matrix which rods are available under the trademark RYTON PPS from Phillips Petroleum Company, Bartlesville, OK.

Preferred are fibers of high Young's modulus such as those of aramid, glass and carbon. The fibers may be treated to enhance adhesion to the polymeric resin. Such treatment is not within the scope of the present invention but is well known to those skilled in the manufacture of fibers for reinforcement of composites.

The fibrous material tow 105 which is utilized to form the reinforcing fabric layer 106 may itself be formed of a plurality of sub-elements such as filaments of generally rounded cross-sectional configuration. The filaments ma be incapsulated with polymeric matrix. The filaments may be twisted together into a yarn. A plurality of may be twisted into a cord. A plurality of cords may be twisted to form a larger continuous fibrous material element. Fibrous material 105 may be of flattened or rounded cross-sectional configuration and may be twisted or untwisted or braided. Preferably, either fibrous material tows 105 are impregnated prior to forming into reinforcing fabric layer 106 or are laid onto a previously applied layer of polymeric material, preferably liquid polymeric material which wets the fibers and encapsulates them.

Due to the character of the reinforcing fabric layer 106 and the fact that it is undulate and thus closely conforms to the male pattern provided by the threaded core 100, the internal threads of female member 110 and those derived therefrom are reinforced against rupture. Due to the multi-directional character of the filaments of the reinforcing fabric layer, at least some of the filaments of the textile reinforcing material are oriented in planes at a considerable angle to the plane of the shearing forces acting on the internal threads of member 110.

Resins which set by chemical action alone without application of heat may also be employed. The resin employed in the manufacture of the internally threaded member such as nut 112 which is to be joined with a composite shank such as 121 to form a bolt or capscrew 120 is selected so as to be compatible with the resin employed in the manufacture of such shank.

Although the invention has been described with reference to its preferred embodiments, other embodiments can achieve similar results. Variations and modifications of the present invention will be obvious to those skilled in the art and it is intended to cover in the appended claims all such modifications and equivalents.

What is claimed is:

1. A hollow internally threaded member formed of fibers in a polymer matrix, said member having an interior surface having an integral thread having a rounded apex, the hollow member comprising a polymeric matrix encapsulating a bundle of successively applied coaxial reinforcing fabric layers extending throughout in the axial direction of the hollow member, the innermost layer of reinforcing fabric having continuous undulate members closely conforming to the contour of the thread.

2. In combination, a hollow internally threaded member formed of fibers in a polymer matrix, said member having an interior surface having an integral thread having a rounded apex, said thread including a reinforcing fabric layer extending in the axial direction of the member and conforming to the threads, the hollow member being threadedly joined to an externally threaded member of complementary thread pitch and thread diameter and bonded thereto by polymeric material.

3. In combination, a hollow internally threaded member formed of fibers in a polymeric matrix, said member having an interior surface having an integral thread having a rounded apex, said thread including a reinforcing fabric layer extending in the axial direction of the member and conforming to the threads, the hollow member being threadedly joined to externally threaded member of complementary thread pitch and thread diameter, the externally threaded member comprising an elongate core and an integral tubular braided layer bonded to the exterior surface of the core, the braided layer including at least one element of greater radial projection relative to the core than the remainder of the elements forming the braided layer, said at least one element of greater radial projection defining the helical thread appearing on the exterior surface of the core.

4. In combination, a hollow internally threaded member formed of fibers in a polymer matrix, said member having an interior surface having an integral thread having a rounded apex, said thread including a reinforcing fabric layer extending in the axial direction of the member and conforming to the threads, the hollow member being threadedly joined to an externally threaded member of complementary thread pitch and thread diameter, the externally threaded member comprising a fiber-reinforced polymeric rod having a thread defining element helically extending around and along the lengthwise direction of the core and projecting radially outwardly of the core, and a fabric layer enveloping, conforming and secured to the outer surface of the combined core and thread-defining element.

5. In combination, a hollow internally threaded member formed of fibers in a polymer matrix, said member having an interior surface having an integral thread having a rounded apex, said thread including a reinforcing fabric layer extending in the axial direction of the member and conforming to the threads, the hollow member being threadedly joined to an externally threaded member of complementary thread pitch and thread diameter, the externally threaded member comprising a polymeric rod having reinforcing textile fibers selected from the group consisting of carbon fibers, glass fibers and aramid fibers extending throughout in the lengthwise direction of the rod, said rod having its thread reinforced by a continuous textile fabric layer enveloping, conforming and bonded with a polymeric matrix to the polymeric rod.

6. In combination, the hollow member of claim 1 threadedly joined to an externally threaded member of complementary thread pitch and thread diameter.

7. The combination of claim 6 wherein the hollow member and externally threaded member are together bonded by polymeric material.

8. A hollow internally threaded member formed of fibers in a polymer matrix, said member having an interior surface having an integral thread having a rounded apex, said thread including a reinforcing fabric layer extending in the axial direction of the member and conforming to the threads, wherein the reinforcing fabric layer is selected from the group consisting of tubular braided fabric and tubular knit fabric.

9. The hollow member of claim 8 wherein the thread is reinforced with closely spaced fibers which extend axially of the hollow member in opposite sense helices.

10. The hollow member of claim 8 including a plurality of layers of reinforcing fabric distributed throughout.

11. In combination, the hollow member of claim 8 threadedly joined to an externally threaded member of complementary thread pitch and thread diameter.

12. The combination of claim 11 wherein the hollow member and externally threaded member are together bonded by polymeric material.

* * * * *